United States Patent [19]

Newkirk

[11] Patent Number: 5,110,675
[45] Date of Patent: * May 5, 1992

[54] CERAMIC ARTICLES WITH A POLYMER COMPONENT AND METHODS OF MAKING SAME

[75] Inventor: Marc S. Newkirk, Newark, Del.

[73] Assignee: Lanxide Technology Company, LP, Newark, Del.

[*] Notice: The portion of the term of this patent subsequent to Jan. 9, 2007 has been disclaimed.

[21] Appl. No.: 415,181

[22] Filed: Sep. 29, 1989

Related U.S. Application Data

[60] Division of Ser. No. 67,522, Jun. 26, 1987, Pat. No. 4,892,786, which is a continuation-in-part of Ser. No. 908,054, Sep. 16, 1986, abandoned.

[51] Int. Cl.$^5$ .................... C22K 1/02; C25C 3/08
[52] U.S. Cl. .................... 428/312.2; 428/306.6; 428/307.3; 428/312.6; 428/312.8; 428/319.3; 428/457; 428/469
[58] Field of Search .............. 428/307.3, 312.2, 319.3, 428/306.6, 698, 688, 457, 469, 312.6, 312.8

[56] References Cited

U.S. PATENT DOCUMENTS

| | | | |
|---|---|---|---|
| 1,447,407 | 3/1923 | Blumenthal | 428/307.3 |
| 2,657,153 | 10/1953 | Russell | 427/393.6 |
| 2,741,822 | 4/1956 | Udy | 25/157 |
| 3,172,775 | 3/1965 | Shaines | 427/393.6 X |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,560,320 | 2/1971 | Letteron | 428/312.2 |
| 3,607,681 | 9/1971 | Cooke et al. | 427/314 X |
| 3,712,830 | 1/1973 | Kirchner | 427/314 X |
| 3,713,867 | 1/1973 | Parkinson et al. | 427/314 X |
| 3,720,543 | 3/1973 | Bockstie, Jr. | 428/306.6 |
| 3,789,096 | 1/1974 | Church et al. | 264/60 |
| 3,864,154 | 2/1975 | Gazza et al. | 29/123 B |
| 3,926,702 | 12/1975 | Oki et al. | 427/243 X |
| 3,973,977 | 8/1976 | Wilson | 106/62 |
| 4,000,982 | 1/1977 | Ueda | 428/560 X |
| 4,119,763 | 10/1978 | Blair | 428/560 X |
| 4,204,021 | 5/1980 | Becker | 427/247 X |
| 4,215,161 | 7/1980 | Seibold et al. | 427/393.6 X |
| 4,267,211 | 5/1981 | Yajima et al. | 427/393.6 X |
| 4,299,865 | 11/1981 | Clingman et al. | 427/243 |
| 4,525,429 | 6/1985 | Kaiser et al. | 428/566 |
| 4,536,358 | 8/1985 | Welsh et al. | 427/249 X |
| 4,551,358 | 11/1985 | Lane et al. | 427/435 X |
| 4,591,480 | 5/1986 | Morishita et al. | 428/550 X |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |
| 0193292 | 9/1986 | European Pat. Off. |
| 42-16852 | 9/1967 | Japan |

OTHER PUBLICATIONS

"Oxidation of Molten Aluminum Alloys, Reaction with Refractories"—M. Drouzy and M. Richard—Mar., 1974 Fonderie, France No. 332 pp. 121–128.

"Refractories for Aluminum Alloy Melting Furnaces'-'—B. Clavaud and V. Jost—Sep., 1980—Lillian Brassinga (from French) Jan., 1985.

*Primary Examiner*—James J. Seidleck
*Assistant Examiner*—Archene Turner
*Attorney, Agent, or Firm*—Mark G. Mortenson; Michael K. Boyer; Carol A. Lewis

[57] ABSTRACT

A self-supporting ceramic body having a polymer component, which includes first providing a self-supporting ceramic body comprising (i) a polycrystalline oxidation reaction product formed upon oxidation of a molten parent metal with an oxidant, and (ii) interconnected porosity at least partially accessible from one or more surfaces of said ceramic body. The polymer is disposed or formed within the interconnected porosity. The polymer is situated so as to alter, modify or contribute to the properties of the ceramic body originally formed.

3 Claims, 3 Drawing Sheets

CERAMIC ARTICLES WITH A POLYMER COMPONENT AND METHODS OF MAKING SAME

CROSS-REFERENCE TO RELATED APPLICATION

This application is a division of U.S. patent application Ser. No. 07/067,522, filed Jun. 26, 1987, now U.S. Pat. No. 4,882,786, which is a continuation-in-part of U.S. patent application Ser. No. 908,054, filed Sep. 16, 1986, now abandoned, in the name of Marc S. Newkirk and entitled "Ceramic Articles with a Polymer Component and Methods of Making Same".

FIELD OF THE INVENTION

The present invention relates generally to a method of modifying a self-supporting ceramic body having interconnected porosity by incorporating a polymer into its porosity. More particularly, this invention relates to self-supporting ceramic bodies formed as the oxidation reaction product of a parent metal and having a polymer component occupying at least a portion of the original interconnected porosity. The invention also relates to methods for producing such ceramic bodies.

DESCRIPTION OF COMMONLY OWNED PATENTS AND PATENT APPLICATIONS

The subject matter of this application is related to copending and Commonly Owned U.S. Pat. No. 4,713,360, which issued on Dec. 15, 1987, based on U.S. application Ser. No. 818,943, filed Jan. 15, 1986, which is a continuation-in-part of Ser. No. 776,964, filed Sep. 17, 1985, now abandoned which is a continuation-in-part of Ser. No. 705,787, filed Feb. 26, 1985, now abandoned which is a continuation-in-part of U.S. application Ser. No. 591,392, filed Mar. 16, 1984, now abandoned all in the names of Marc S. Newkirk, et al, and entitled "Novel Ceramic Materials and Methods for Making the Same". These applications disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation product toward the oxidant thereby continuously developing a polycrystalline ceramic body which can be produced having an interconnected, metallic component and/or interconnected porosity. The process may be enhanced by the use of an alloyed dopant, such as in the case of an aluminum parent metal oxidized in air. This method was improved by the use of external dopants applied to the surface of the precursor metal as disclosed in Commonly Owned and copending U.S. patent application Ser. No. 220,935, filed Jun. 23, 1988, now U.S. Pat. No. 4,853,352, which is a continuation of Ser. No. 822,999, filed Jan. 27, 1986, now abandoned, which is a continuation-in-part of Ser. No. 776,965, filed Sep. 17, 1985, now abandoned which is a continuation-in-part of Ser. No. 747,788, filed Jun. 25, 1985, now abandoned, which is a continuation-in-part of Ser. No. 632,636, filed Jul. 20, 1984, now abandoned all in the names of Marc S. Newkirk, et al and entitled "Methods of Making Self-Supporting Ceramic Materials".

The subject matter of this application is also related to that of copending and Commonly Owned U.S. patent application Ser. No. 819,397, filed Jan. 17, 1986, now U.S. Pat. No. 4,851,375, which is a continuation-in-part of Ser. No. 697,876, filed Feb. 4, 1985, now abandoned both in the names of Marc S. Newkirk, et al and entitled "Composite Ceramic Articles and Methods of Making Same". These applications disclose a novel method for producing self-supporting ceramic composite bodies by growing an oxidation reaction product from a parent metal into a permeable mass of filler, thereby infiltrating the filler with a ceramic matrix.

Composite bodies comprising a metal boride, a metal component and, optionally, an inert filler are disclosed in commonly owned and copending U.S. Pat. No. 4,777,014, which issued on Oct. 11, 1988, based on U.S. application Ser. No. 837,448, filed Mar. 7, 1986, in the name of Marc S. Newkirk, et al and entitled "Process of Preparing Self-Supporting Bodies and Products Made Thereby". According to this invention, molten parent metal infiltrates a mass of boron source, which may be admixed with an inert filler, and reacts with the boron source thereby forming a parent metal boride. The conditions are controlled to yield a composite body containing varying volume percents of ceramic and metal.

The entire disclosure of all of the foregoing Commonly Owned Patent Applications and Patents are expressly incorporated herein by reference.

Common to each of these Commonly Owned Patent Applications and Patent is the disclosure of embodiments of a ceramic body comprising an oxidation reaction product and, optionally, one or more nonoxidized constituents of the parent metal precursor or voids or both. The oxidation reaction product may exhibit interconnected porosity which may be a partial or nearly complete replacement of the metal phase. The interconnected porosity will largely depend on such factors as the temperature at which the oxidation reaction product is formed, the length of time at which the oxidation reaction is allowed to proceed, the composition of the parent metal, the presence of dopant materials, etc. Some of the interconnected porosity is accessible from an external surface or surfaces of the ceramic body, or is rendered accessible by a post-process operation as by machining, cutting, grinding, fracturing, etc.

SUMMARY OF THE INVENTION

Briefly, the present invention is directed to a method of producing a self-supporting ceramic or ceramic composite body containing or having incorporated therein a polymer. The polymer is sufficient so as to alter, modify or contribute to the properties of the ceramic body originally formed. In accordance with the method of the present invention, a ceramic body is formed by the oxidation reaction of a parent metal with an oxidant, such as described above in connection with the Commonly Owned Patent Applications and Patents. The ceramic body is produced to have interconnected porosity distributed through at least a portion of the ceramic body in one or more dimensions, and further is at least partially open or accessible, or rendered accessible, from at least one external surface of the body. A liquid or fluid polymer, or the precursor monomer, is contacted with the ceramic body at the accessible surface so as to infiltrate at least a portion of the interconnected porosity followed by subsequent cooling or curing of the polymer, thereby forming a ceramic body containing a polymer component.

Adding the polymer in at least a portion of the interconnected porosity may be accomplished, for example, by forming the polymer in situ from a monomer infiltrated into the porosity, or by contacting the surface of the ceramic body with a polymer and infiltrating the interconnected porosity with the polymer, to form a ceramic body containing the polymer component.

The self-supporting ceramic body of the present invention comprises a polycrystalline ceramic product having (a) interconnected reaction product crystallites formed upon oxidation of a molten parent metal with an oxidant, and (b) an interconnected porosity at least partially open or accessible, or rendered accessible, from the surface(s) of the ceramic body. At least a portion of the interconnected porosity contains a polymer.

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents and/or porosity (interconnected and isolated) most typically within a range of from about 1-40% by volume, but may be higher.

"Oxidation reaction product" generally means one or more metals in any oxidized state wherein the metal has given up electrons to or shared electrons with another element, compound, or combination thereof. Accordingly, an "oxidation reaction product" under this definition includes the product of reaction of one or more metals with an oxidant such as those described herein.

"Oxidant" means one or more suitable electron acceptors or electron sharers and may be a solid, a liquid or a gas (vapor) or some combination of these (e.g. a solid and a gas) at the process conditions for ceramic growth.

"Parent metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context. For example, when aluminum is the parent metal, the aluminum may be relatively pure metal (e.g. commercially available aluminum of 99.7% purity), or 1100 aluminum having as nominal impurities of about 1% by weight silicon plus iron, or aluminum alloys such as, for example, 5052.

DETAILED DESCRIPTION OF THE INVENTION AND THE PREFERRED EMBODIMENTS

In accordance with the method of this invention, a self-supporting ceramic body is produced with interconnected porosity. The interconnected porosity is at least partially open or accessible from an external surface (or surfaces), or is rendered accessible by post-process opening. A significant or substantial amount of the interconnected porosity is filled, infiltrated, or the like, with a polymer which becomes integral with the final ceramic body, thereby modifying, improving or contributing to certain properties of the ceramic body. Although the invention is described below with particular reference to aluminum as the parent metal, it should be understood that other parent metals are also applicable, such as silicon, titanium, tin, zirconium, and hafnium.

Figure 1:
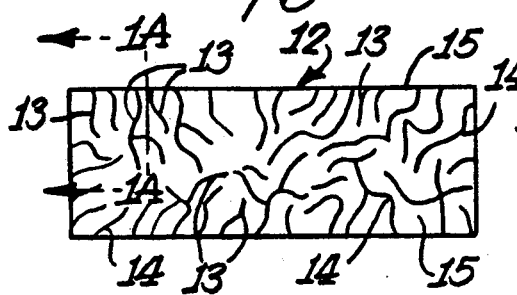
FIG. 1 is a schematic view of a ceramic body having interconnected porosity and interconnected metal.

Referring to FIG. 1, a self-supporting polycrystalline ceramic body 12 is first provided, which is made, for example, by the methods of any of the above referred to Commonly Owned Patent Applications and Patents. Accordingly, a parent metal, e.g. aluminum, which may be doped (as explained below in greater detail) is provided as the precursor to the oxidation reaction product. The parent metal is melted within an appropriate temperature envelope in or immediately adjacent to an oxidizing environment. At this temperature, or within this temperature range, the molten metal reacts with the oxidant to form a polycrystalline oxidation reaction product. At least a portion of the oxidation reaction product is maintained in contact with and between the molten metal and the oxidant to draw molten metal through the oxidation reaction product and into contact with the oxidant such that the oxidation reaction product continues to form at the interface between the oxidant and previously formed oxidation reaction product. The reaction is continued for a time sufficient to form the polycrystalline ceramic body consisting essentially of the oxidation reaction product, generally illustrated as 12, an interconnected porosity 13, and/or an interconnected metallic-containing component 14. The interconnected porosity 13, as well as the interconnected metallic-containing component 14, is interconnected in one or more dimensions and is dispersed or distributed through part or substantially all of the polycrystalline material. This porosity 13, and metal component 14, formed in situ during formation of the polycrystalline oxidation reaction product, are both at least partially open or accessible from at least one surface, as at surfaces 15, of the ceramic body, or may be rendered accessible as by machining or fracturing. Some of the porosity and the metal may be isolated as islands. The volume percents of porosity 13 (interconnected and isolated) and metal 14 (interconnected and isolated) will depend largely on such conditions as temperature, time, dopants, and type of parent metal.

Figure 2:
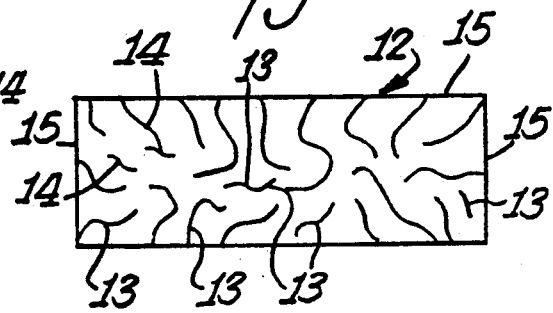
FIG. 2 is a schematic view of a ceramic body after a substantial part of the interconnected metal has been removed.
Figure 1A:
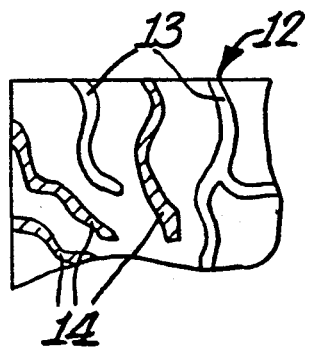
FIG. 1A is an enlarged section on line A—A of FIG. 1.

In a preferred embodiment of the invention, essentially or substantially all of the interconnected metal 14 is or should be removed to produce a self-supporting ceramic body 12 having interconnected porosity 13 distributed through part or substantially all of the polycrystalline material, as illustrated in FIG. 2. In order to remove all or a substantial part of the interconnected metal 14, the oxidation reaction process is taken to completion; that is, when the metal phase has been completely reacted or nearly completely reacted to form oxidation reaction product, the interconnected metal constituent 14 is drawn from the ceramic body 12 leaving interconnected porosity 13 in its place to form additional ceramic on its surface(s) 15. If the process is taken to completion, the oxidation reaction product will exhibit a higher volume percent of porosity 13 which is at least partially interconnected. For example, a ceramic body formed from aluminum processed in air at about 1125° C. may contain from about 20 volume percent to about 30 volume percent metal 14, and from about 2 volume percent to about 5 volume percent porosity 13 when growth is stopped before all the metal is oxidized; and if processed to complete the oxidation of all the metal, may contain from about 1 volume percent to about 3 volume percent parent metal and from about 25 volume percent to about 30 volume percent (or higher) voids or pores when the process is run to completion.

Figure 3:
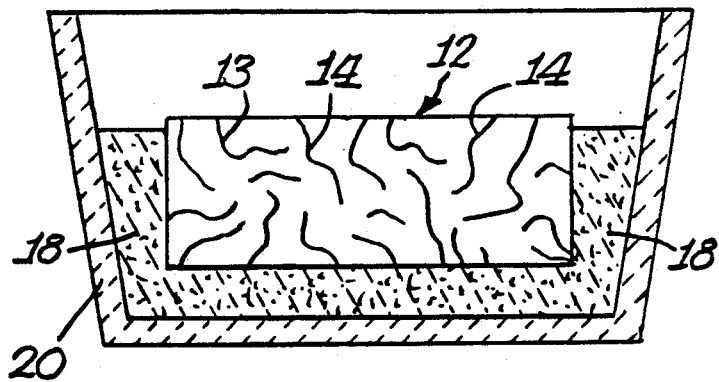
FIG. 3 is a schematic view of a ceramic body in an inert bed contained within a crucible which is to be inserted into a furnace to vaporize the interconnected metal.

A second method or means of removing interconnected metal 14 is to place the ceramic body 12 in an inert bed 18 that is contained within a crucible or other refractory container 20 (see FIG. 3). The container 20 and its contents are then placed into a furnace having an inert atmosphere, e.g. argon or any other nonreactive gas) and heated to temperatures where the metallic constituent will have a high vapor pressure. This temperature or preferred range can vary depending upon such factors as parent metal, time, and the end composition of the metallic constituent. At the suitable temperature, interconnected metal 14 will vaporize from the ceramic body. No additional oxidation reaction product will form because of the inert atmosphere. By maintaining these temperatures, the interconnected metal 14 will continue to vaporize and be carried away from the furnace by a suitable venting means within the furnace.

Figure 4:
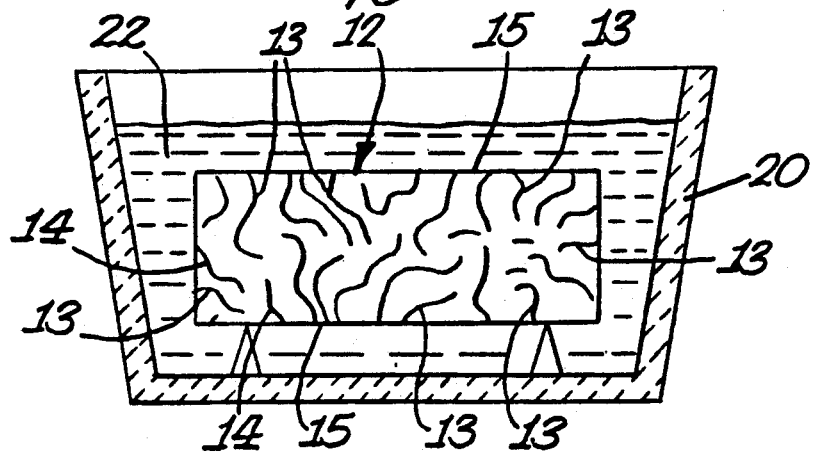
FIG. 4 is a schematic view of a ceramic body immersed in a solvent leachant in order to remove the interconnected metal.

A third method or means of removing interconnected metal 14 is to place or immerse the ceramic body 12 into a suitable leachant 22 to dissolve or disperse out the interconnected metal (see FIG. 4). The leachant 22 may be any acidic or caustic liquid or gas which will depend upon such factors as the type of metal, time of immersion, etc. In the case of using aluminum as the parent metal, and therefore having aluminum in the interconnected metal, HCl has been found to be a suitable acidic medium. If the ceramic body contains silicon, NaOH and/or KOH is an acceptable caustic medium. The time of immersion of the ceramic body in the leachant 22 will depend upon the amount and type of the metallic component, and where the interconnected metal 14 is situated with respect to the surface(s) 15. The deeper the interconnected metal 14 is in the ceramic body 12 the longer it will take such metal 14 to be etched out, and the longer the ceramic body will have to be left in the leachant 22. This extraction step may be facilitated by heating the leachant or by agitating the bath. After the ceramic body 12 has been removed from the leachant 22, the body 12 should be washed to remove any residual leachant.

When essentially or substantially all of the interconnected metal 14 has been removed, a self-supporting ceramic body 12 is produced which comprises a polycrystalline oxidation reaction product formed upon oxidation of a molten parent metal precursor with an oxidant and interconnected porosity 13 which preferably comprises from about 5 volume percent to about 45 volume percent of the ceramic body 12. A polymer is disposed or formed within the interconnected porosity 13 to produce a ceramic body 12 with polymer essentially integral therewith. The polymer modifies, improves or contributes to the properties of the ceramic body 12. For example, if a ceramic body 12 is produced for use as a bearing, a polytetrafluoroethylene material incorporated into the ceramic body will provide a lubricant between the ceramic bearing surface and any frictional surface.

A variety of polymers useful in this invention can be disposed and/or formed within the interconnected porosity 13. Useful polymers include, for example, polyolefins having their genesis from such monomer(s) or co-monomer(s) as ethylene, propylene, butenes, butadiene, styrene, etc. A particularly suitable monomer is tetrafluorethylene which, when polymerized, produces the polymer, polytetrafluoroethylene, sold under the trademark Teflon ®, which can provide a useful lubricating surface.

Polymers from the vinyl family and the acrylic family are also suitable polymers to be formed and/or disposed within the interconnected porosity 13. Such vinyl polymers as polyvinyl chloride, polyacrylonitrile, polyvinyl alcohol, polyvinyl acetate and polyvinylidene chloride are useful as a polymer(s), as well as polymethylacrylate, polymethyl-methacrylate and polyethylmethacrylate from the acrylic family.

Other suitable polymers include, by way of example only, polyesters, polyamides (nylon), polycarbonates, phenol-formaldehydes, urea-formaldehydes, polyurethane, epoxies from ethylene oxide, silicones and silanes. Also, naturally occurring polymers, such as rosin and shellac(s), as well as rubber solutions (e.g. rubber cement), are also suitable polymers which can be employed to fill the inter-connected porosity 13. If polyurethane is employed as the polymer, the toughness of the ceramic body is enhanced. An epoxy resin will increase the strength of the ceramic body. It should be understood that the foregoing list of polymers is merely illustrative for the purposes of this invention, and there are other polymers which are not listed or mentioned and which would fall within the spirit and scope of this invention.

Figure 5:
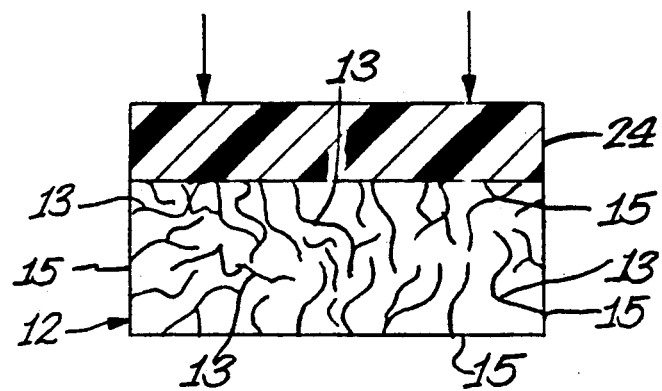
FIG. 5 is a schematic view of a ceramic body imposed with a polymer mass which is to be driven into the interconnected porosity.

The polymers can be positioned or disposed within the interconnected porosity 13 by situating a solid polymer mass or block 24 (see FIG. 5) against one or more of the surfaces 15 of the ceramic body 12 and forcing, such as by pressure (as indicated by the directional arrows in FIG. 5), the polymer mass or block 24 into the pores of the interconnected porosity 13. The feasibility of this procedure obviously depends upon the type of polymer, as some polymers are too hard or brittle for such a procedure, and upon the degree of porosity. Other polymers may have to be initially heated to form a viscous or fluidized mass to facilitate disposal or infiltration into the interconnected porosity 13.

Figure 6:
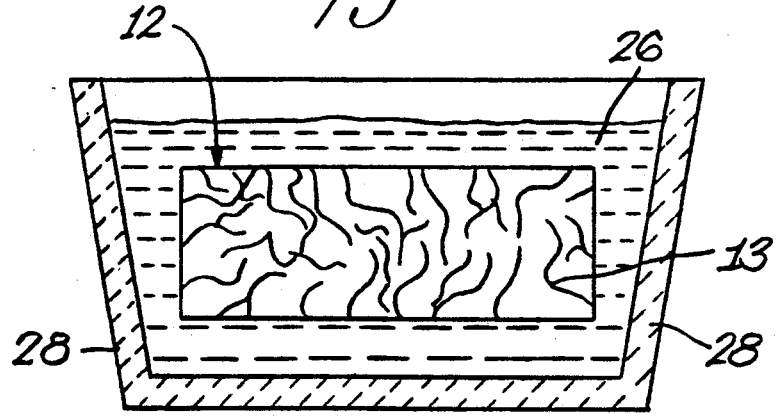
FIG. 6 is a schematic view of·a ceramic body immersed in a liquid monomer which is to fill the interconnected porosity.

The polymers can be formed within the interconnected porosity 13 by soaking or immersing the ceramic body 12 in a liquid monomer 26 of the polymer to be formed (see FIG. 6) contained in vessel 28. The ceramic body 12 remains in the liquid monomer 26 until the interconnected porosity 13 has been infiltrated or impregnated by the liquid monomer 26. The liquid monomer-impregnated ceramic body 12 is subsequently removed from the container 28, and is placed within a reaction zone of a reactor (not shown in the drawings) where it is subjected to polymerizing conditions to polymerize the liquid monomer into a polymer.

Another method or means of forming a polymer within the interconnecting porosity 13 is to impregnate the interconnecting porosity with a polymerizing catalyst. The catalyst-containing ceramic body 12 is placed in a reaction zone of a reactor (not shown in the drawings), and a polymerizable fluid (which may be a gas or a liquid) is passed or diffused through the catalyst-containing ceramic body 12 under polymerizing conditions. When the polymerizable fluid contacts the polymerizing catalyst within the interconnected porosity 13, a polymer is formed at the situs of the polymerizing catalyst. The polymerizing catalyst may be distended within the interconnected porosity 13 by known methods for impregnating a ceramic with a catalyst, and this step, per se, forms no part of the invention.

Polymerization can be effected at selected temperatures which vary in accordance with the polymerization activity of the specific monomers, catalysts, desired reaction rates and the type of product which is desired. For example, selected polymerization temperatures generally fall within the range of about −40° C. to about 300° C., more particularly 25° C. to 175° C. for ethylene and similar monomers.

Polymerization can be effected at atmospheric pressure or even lower pressures, but it may be advantageous to use superatmospheric pressures in order to obtain desirable monomer concentrations in contact with the catalyst. Thus, the polymerization can be conducted at pressures up to 10,000 p.s.i. or even higher pressures. Here again, for the olefins, usually polymerization is effected at pressures between about 50 and about 2000 p.s.i.a.

The ceramic body may be ground or pulverized to form an aggregate of ceramic particles which, because of the porosity in the original ceramic body, exhibit intra-particle porosity. This aggregate may be consolidated, as into a preform, with a suitable binder which does not interfere with the polymerization reactions, or leave undersirable residual by-products within the ceramic body 12. This preform is impregnated with a polymer, as described above, and the polymer will impregnate the inter-aggregate volume of the preform and the intra-pore volume of the aggregate such that the polymer is now the matrix for the ceramic aggregate.

As explained above, the ceramic body is produced from a suitable parent metal according to the processes disclosed in the Commonly Owned Patent Applications and Patents. In one preferred embodiment of this invention, a ceramic composite, body is produced by utilizing a mass of filler material placed adjacent to and in contact with a surface of the parent metal, and the process is continued until the oxidation reaction has infiltrated the bed of filler material to its boundary which can be defined by a suitable barrier means. The mass of filler, which preferably is shaped as a preform, is sufficiently porous or permeable to allow the oxidant, in the case of a gas-phase oxidant, to permeate the filler and contact the metal, and to accommodate growth of the oxidation reaction product within the filler. The filler may include any suitable material such as particulates, powders, platelets, hollow bodies, spheres, fibers, whiskers, etc., which typically are ceramic materials. Further, the bed of filler may include a lattice of reinforcing rods, plates, or wires. Typically, in these polycrystalline ceramic structures, including ceramic composites, the oxidation reaction product crystallites are interconnected and the porosity and/or metallic component are at least partially interconnected and accessible from an external surface of the ceramic body.

As explained in the Commonly Owned Patent Applications and Patents, dopant materials used in conjuction with the parent metal can, in certain cases, favorably influence the oxidation reaction process, particularly in systems employing aluminum as the parent metal. The function or functions of a dopant material can depend upon a number of factors other than the dopant material itself. Such factors include, for example, the particular combination of dopants when two or more dopants are used, the use of an externally applied dopant in combination with a dopant alloyed with the parent metal, the concentration of the dopant(s), the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to or incorporated into part or all of the filler material or preform, or any combination of two or more techniques (1), (2) and (3) may be employed. For example, an alloyed dopant may be used solely, or in combination with a second externally applied dopant. In the case of technique (3), where additional dopant or dopants are applied to the filler material, the application may be accomplished in any suitable manner as explained in the Commonly Owned Patent Applications and Patents.

Dopants useful for an aluminum parent metal, particularly with air as the oxidant, include magnesium, zinc, and silicon either alone or in combination with each other or in combination with other dopants, as described below. These metals, or a suitable source of the metals, may be alloyed into the aluminum-based parent metal at concentrations for each of between about 0.1-10% by weight based on the total weight of the resulting doped metal. These dopant materials or a suitable source thereof (e.g. MgO, ZnO, or $SiO_2$) may also be used externally to the parent metal. Thus, an alumina ceramic structure is achievable for an aluminum-silicon alloy as the parent metal, using air as the oxidant, by using MgO as a surface dopant in an amount greater than about 0.0008 gram per gram of parent metal to be oxidized, or greater than 0.003 gram per square centimeter of parent metal upon which the MgO is applied.

Additional examples of dopant materials effective with aluminum parent metals oxidized with air include sodium, germanium, tin, lead, lithium, calcium, boron, phosphorus, and yttrium, which may be used individually or in combination with one or more dopants depending on the oxidant and process conditions. Rare earth elements such as cerium, lanthanum, praseodymium, neodymium, and samarium are also useful dopants, and herein again especially when used in combination with other dopants. All of the dopant materials as explained in the Commonly Owned Patent Applications and Patents are effective in promoting polycrystalline oxidation reaction product growth for the aluminum-based parent metal systems.

A solid, liquid or vapor-phase (gas) oxidant, or a combination of such oxidants, may be employed, as noted above. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

Although any suitable oxidants may be employed, a vapor-phase oxidant is preferred, but it should be understood that two or more types of oxidants may be used in combination. If a vapor-phase oxidant is used in conjunction with a filler, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants when an oxide is the desired oxidation reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air, therefore, falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and about 4 volume percent hydrogen.

When a solid oxidant is employed in conjunction with a filler, it is usually dispersed through the entire bed of filler or through that portion of the bed comprising the desired ceramic composite body, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed in conjunction with a filler, the entire bed of filler, or that portion comprising the desired ceramic body, is impregnated with the oxidant. The filler, for example, may be coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g. a solution of a material, which is used to impregnate part or all of the filler and which is melted or decomposed at the oxidation reaction conditions to provide a suitable oxidant moiety. Examples of liquid oxidants as herein defined include low melting glasses.

As described in co-pending U.S. patent application Ser. No. 861,024 filed on May 8, 1986, now U.S. Pat. No. 4,923,832, and assigned to the same assignee, a barrier means may be used in conjunction with the filler material or preform to inhibit growth or development of the oxidation reaction product beyond the barrier when vapor-phase oxidants are employed in the formation of the ceramic body. This barrier facilitates the formation of a ceramic body with defined boundaries. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (plaster of paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulates, desirably having a mesh size of about 20-100 but may be still finer. Other suitable barriers include refractory ceramics or metal sheaths which are open on at least one end to permit a vapor-phase oxidant to permeate the bed and contact the molten parent metal.

The following non-limiting example is provided to illustrate the method of this invention.

EXAMPLE 1

A ceramic body having interconnected porosity was prepared by the methods of the Commonly Owned Patent Applications and Patents. Specifically, 8"×9"×½" bars of aluminum alloy 5052, containing nominally 2.4% by weight magnesium, balance aluminum, were stacked three high in a bed of aluminum oxide particles (Norton E-1 Alundum of 90 mesh particle size) in a refractory container. The alloy bars were positioned in the bed such that one 2"×9" surface was flush with the surface of the bed and exposed to the atmosphere. This exposed surface was covered with a thin layer of 140 mesh $SiO_2$ particles of 12 grams total weight. The resulting setup was placed in a furnace and heated in air at 1125° C. for 336 hours. After cooling to ambient temperature, it was found that a layer of aluminum oxide ceramic material had grown upward from the originally exposed, $SiO_2$-coated surface of the alloy, and that the starting aluminum alloy bar had been completely consumed in the oxidation reaction. Pieces of ceramic material were cut from the reaction product such that any spinel layer from the inner surface and any higher density layers on the external surface were removed from the material processed further in this Example.

Examination of ceramics produced by this procedure revealed that it contained interconnected porosity, as evidenced, for example, by simple water permeability tests. Comparison with similar samples reacted for shorter time periods such that the alloy bar was not completely consumed revealed that the interconnected porosity resulted from the removal of interconnected metal from microscopic channels or passages in the ceramic. This apparently occurred because metal drawn to the surface to form additional aluminum oxide could not be replenished from the depleted alloy bar.

To complete the removal of metal from the grown ceramic material, pieces of it were heated at 1600° C. for 96 hours in an argon atmosphere. Under such conditions the residual aluminum in the body plus any small amounts of silicon from the $SiO_2$ dopant layer were found to be readily eliminated from the ceramic body by volatilization. The resulting material contains an estimated 30–40 volume percent of porosity which is largely interconnected.

To fill the interconnected porosity with a polymer, epoxy resin was blended with liquid hardener in the proportions 5 to 1 by weight, and the resulting liquid precursor was poured into a disposable form containing the ceramic piece.

Sufficient liquid precursor was added to completely surround the composite body. Vacuum impregnation was then applied to enhance the infiltration of the epoxy precursor. This was accomplished by placing the container of polymer liquid and ceramic composite into a vacuum chamber and reducing the pressure to approximately one-half atmosphere to draw entrapped air from the ceramic without causing the polymer liquid to boil. Subsequently the pressure was increased to atmospheric to force the polymer into the interconnected porosity of the ceramic. This depressurization/repressurization cycle was repeated three times, after which the container was removed from the vacuum chamber and the epoxy allowed to cure overnight at room temperature.

Figure 7:
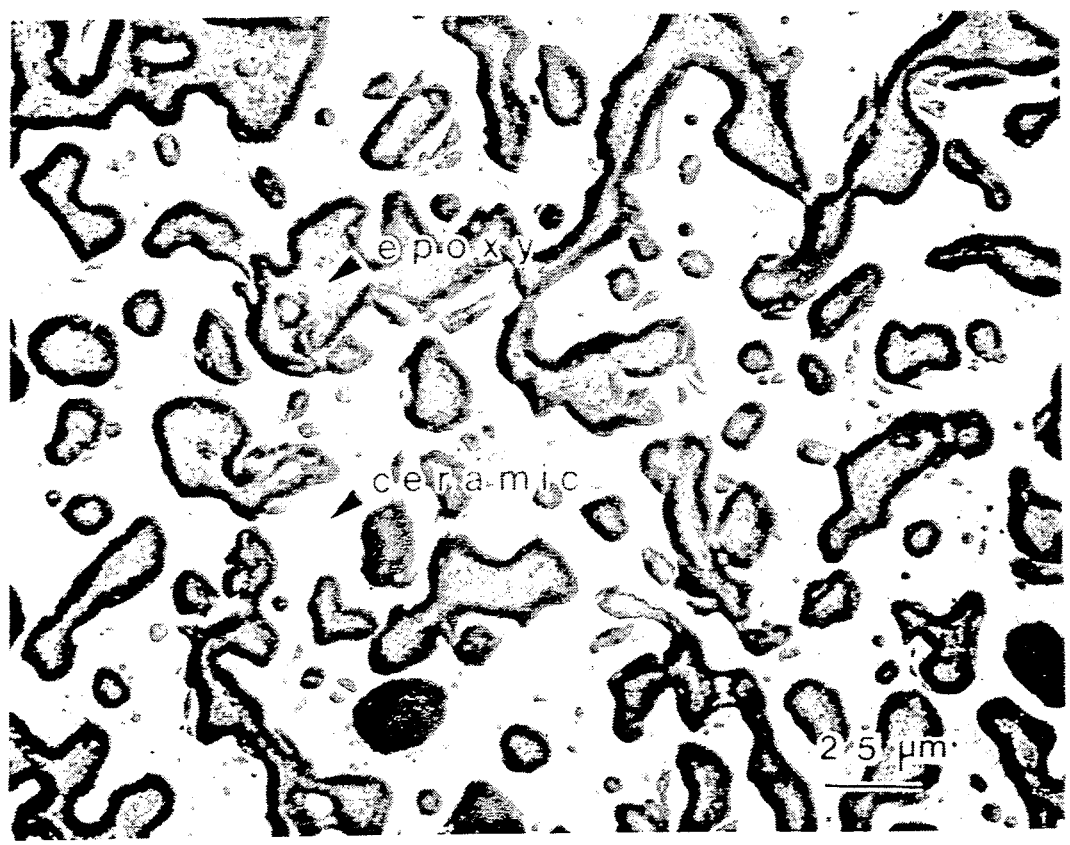
FIG. 7 is a photomicrograph (taken at 400×magnification) in cross-section of the polymer-filled body in Example 1.

After curing, the ceramic body was observed to be well filled with a strong epoxy polymer in the interconnected porosity of the original material. FIG. 7, a photomicrograph taken at 400×magnification of a cross-section through a portion of the resulting polymer-filled body, illustrates the success achieved in the filling of void space in the material.

What is claimed is:

1. A self-supporting ceramic body which comprises:
   (1) a polycrystalline oxidation reaction product comprising (a) interconnected reaction product crystallites, and (b) interconnected porosity distributed through at least a portion of said reaction product crystallites and at least partially accessible from at least one surface of said ceramic body;
   (2) a metallic component which is at least partially interconnected distributed throughout at least a portion of said polycrystalline oxidation reaction product; and
   (3) a curable polymer disposed in at least a portion of said porosity in said polycrystalline oxidation reaction product.

2. The self-supporting ceramic body according to claim 1, wherein said polycrystalline oxidation reaction product comprises at least one material selected from the group consisting of oxides, carbides, borides and nitrides of at least one metal selected from the group consisting of silicon, titanium, tin, zirconium, hafnium and aluminum, and said metallic component comprises at least one metal selected from the group consisting of silicon, titanium, tin, zirconium, hafnium and aluminum.

3. The self-supporting ceramic body according to claim 1, wherein said metallic component comprises at least one metal selected from the group consisting of silicon, titanium, tin, zirconium, hafnium, and aluminum.

* * * * *